United States Patent
Tanigaki et al.

(10) Patent No.: US 9,260,065 B2
(45) Date of Patent: Feb. 16, 2016

(54) HIGH-VOLTAGE HARNESS CONNECTION STRUCTURE FOR ELECTRICALLY DRIVEN VEHICLE

(71) Applicant: Nissan Motor Co., Ltd., Kanagawa (JP)

(72) Inventors: Tatsunori Tanigaki, Kanagawa (JP); Norihisa Tsujimura, Kanagawa (JP); Kentaro Hatta, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 14/420,918

(22) PCT Filed: Aug. 1, 2013

(86) PCT No.: PCT/JP2013/070941
§ 371 (c)(1),
(2) Date: Feb. 11, 2015

(87) PCT Pub. No.: WO2014/034377
PCT Pub. Date: Mar. 6, 2014

(65) Prior Publication Data
US 2015/0217707 A1  Aug. 6, 2015

(30) Foreign Application Priority Data
Aug. 27, 2012  (JP) .................................. 2012-186036

(51) Int. Cl.
*B60K 1/02* (2006.01)
*B60R 16/02* (2006.01)
(Continued)

(52) U.S. Cl.
CPC .............. *B60R 16/0215* (2013.01); *B60K 1/00* (2013.01); *B60K 1/04* (2013.01); *B60L 3/0007* (2013.01);
(Continued)

(58) Field of Classification Search
CPC ... B60R 16/0215; B60W 20/00; B60W 10/08
USPC ............ 180/165, 68.5, 65.1–65.31; 301/147; 174/72 A
See application file for complete search history.

(56) References Cited

U.S. PATENT DOCUMENTS

| 7,561,445 B2 * | 7/2009 | Yajima et al. ................. 361/826 |
| 9,006,939 B2 * | 4/2015 | Toyama et al. ............... 307/147 |
| 2005/0168072 A1 * | 8/2005 | Saito et al. ................... 307/10.1 |

FOREIGN PATENT DOCUMENTS

| JP | 2011-20622 A | 2/2011 |
| JP | 2012-096661 A | 5/2012 |

OTHER PUBLICATIONS

International Search Report for corresponding International Application No. PCT/JP2013/070941, mailed Oct. 8, 2013 (1 page).

*Primary Examiner* — John Walters
*Assistant Examiner* — James Triggs
(74) *Attorney, Agent, or Firm* — Osha Liang LLP

(57) ABSTRACT

A high-voltage harness connection structure for an electrically driven vehicle, having a battery pack disposed in an underfloor position of the vehicle and having a battery-side high-voltage connector terminal disposed on a front end thereof, a power unit arranged in a vehicle forward position with respect to the battery pack and having a unit-side high-voltage connector terminal disposed thereon, and a high-voltage harness that connects the battery-side high-voltage connector terminal and the unit-side high-voltage connector terminal. The harness connection surface of the battery-side high-voltage connector terminal forms a harness connection inclined surface so that the high-voltage harness is connected to be inclined outwardly in a vehicle width direction with respect to a vehicle longitudinal direction, and routed in an outwardly bent state in the vehicle width direction with respect to the vehicle longitudinal direction.

12 Claims, 6 Drawing Sheets

(51) Int. Cl.
*B60K 1/04* (2006.01)
*B60L 3/00* (2006.01)
*B60L 11/18* (2006.01)
*H01M 2/10* (2006.01)
*B60K 1/00* (2006.01)

(52) U.S. Cl.
CPC ............ *B60L 11/18* (2013.01); *B60L 11/1877* (2013.01); *H01M 2/1072* (2013.01); *B60K 2001/0438* (2013.01); *B60Y 2304/01* (2013.01); *H01M 2220/20* (2013.01); *Y02T 10/7005* (2013.01); *Y02T 10/705* (2013.01)

HIGH-VOLTAGE HARNESS CONNECTION STRUCTURE FOR ELECTRICALLY DRIVEN VEHICLE

CROSS-REFERENCE TO RELEVANT APPLICATIONS

The present application claims priority from Japanese Patent Application No. 2012-186036 filed in the Japan Patent Office on Aug. 27, 2012, the disclosure of which is herein incorporated by reference in its entirety.

BACKGROUND

1. Technical Field

The present invention relates to a high-voltage harness connection structure for an electrically driven vehicle, which connects a battery pack and a power unit via a high voltage harness.

2. Related Art

Conventionally, as a harness connection structure of the electrically driven vehicle, a structure is known in which a battery-side high-voltage electric connector terminal provided at the front end of a battery pack and a unit-side high-voltage connector terminal provided on a power unit are connected by a high-voltage harness arranged in the longitudinal direction of the vehicle (for example, Patent Document 1).

Patent Document 1: JP 2011-20622 A

SUMMARY

However, in the high-voltage harness connection structure in the conventional electrically driven vehicle, a harness connection face on the battery-side high-voltage connector terminal is arranged in a plane perpendicular to the vehicle longitudinal direction (i.e. matching the vehicle width direction) so that the high-voltage harness is connected in a vehicle fore-to-aft direction. Thus, when the power unit is retracted due to a front-crush occurrence, because of the relative vehicle longitudinal spacing between the power unit and the battery pack, the harness would start to bend in the buckled state along with the retraction. During the progress of the retraction, the harness is subject to bending exceeding the bending limit of the high-voltage harness, the harness sometimes will be damaged.

Consequently, when placing the power unit and the battery pack in the longitudinal direction of the vehicle, it is necessary to secure the vehicle longitudinal direction spacing between the power unit and the battery pack sufficiently in consideration of the amount of retraction of the power unit at the time of the front-crush, which in turn will pose restriction on the layout freedom of the battery pack in a vehicle.

According to one or more embodiments of the present invention, a high-voltage harness connection structure is capable of preventing the high-voltage harness from being damaged due to the vehicle rearward retraction of the power unit upon an impact force.

A harness connection structure for an electrically driven vehicle according to one or more embodiments of the present invention comprises a battery pack disposed in the underfloor position of a vehicle, a power unit which is arranged in the vehicle forward position with respect to the battery pack, and a high-voltage harness that connects a battery-side high-voltage connector terminal disposed on the front end of the battery pack and a unit-side high-voltage connector terminal disposed on the power unit. In this high-voltage harness connection structure in the electrically driven vehicle, the harness connection surface of the battery-side high-voltage connector terminal is configured to form a harness inclined plane so that the high-voltage harness is connected inclined outward in the vehicle width direction with respect to the vehicle longitudinal direction.

Therefore, the high-voltage harness that connects the battery pack and the power unit is arranged to be inclined in the outer side of the vehicle width direction with respect to the vehicle longitudinal direction.

Therefore, even if the power unit comes to interfere with the high-voltage harness, the power unit would be subjected to a contact interference with the high-voltage harness that is arranged inclined, at the battery-side high-voltage connector terminal, in the vehicle width outside direction with respect to the vehicle longitudinal direction. That is, even if the power unit is retracted toward the rear of the vehicle by the front-crush generation, the incident is held in a situation in which the inclination angle of the high-voltage harness to the vehicle width outward direction will be increased or the amount of bending in the high-voltage harness will be increased with the progress of the recession.

Thus, by configuring the interference of the power unit with the high-voltage harness in response to the retraction of the power unit in a form of a contact interference by inclination, at the time of front-crush generation, even if the power unit retracts in the vehicle rearward direction upon an impact force, the high-voltage harness would be prevented from being damaged.

As a result, as compared with the case where the high-voltage harness is routed in a vehicle longitudinal direction, it is possible to arrange the power unit and the battery pack more closely spaced to each other in the vehicle longitudinal direction so that the vehicle layout freedom of the battery pack is enhanced.

DETAILED DESCRIPTION

Hereinafter, Embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First, a description will be given of the configuration.

The configurations of the high-voltage harness connection structure for an electric vehicle in one or more embodiments of the present invention will be separately described in "SCHEMATIC CONFIGURATION OF ELECTRIC VEHICLE EQUIPPED WITH HARNESS CONNECTION STRUCTURE", "DETAILED CONFIGURATION OF BATTERY PACK BP", and "HIGH-VOLTAGE HARNESS CONNECTION STRUCTURE", respectively.

[Schematic Configuration of Electric Vehicle Equipped with Harness Connection Structure]

Figure 1:
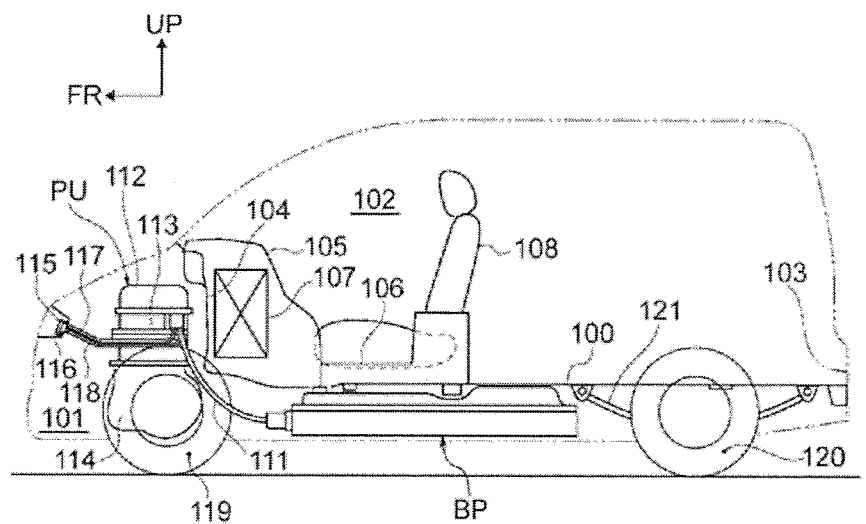
FIG. 1 is a schematic side view showing an electric vehicle of minivan type employing a high-voltage harness connection structure in one or more embodiments of the present invention.
Figure 2:
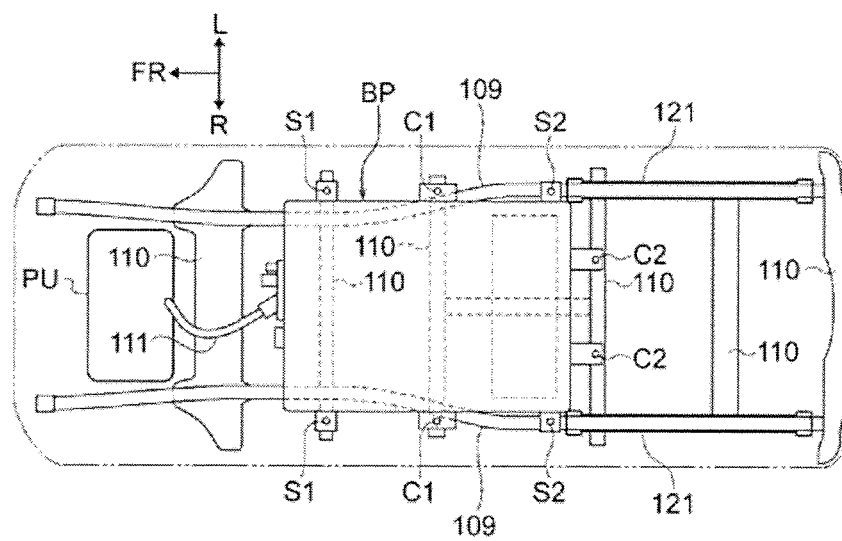
FIG. 2 is a schematic bottom view showing an electric vehicle of minivan type employing a high-voltage harness connection structure in one or more embodiments of the present invention.

FIGS. 1 and 2 is a schematic side view and a schematic bottom view showing an electric vehicle (example of an electrically driven vehicle) of minivan type employing a high-voltage harness connection structure in one or more embodiments of the present invention. Below, based on FIGS. 1 and 2, a description is given of a schematic configuration of the electric vehicle equipped with a harness connection structure.

The electric vehicle is, as shown in FIGS. 1 and 2, a motor compartment 101 and a passenger compartment 102 are defined by a floor panel 100 and a dash panel 104. A battery pack BP is disposed under the floor panel 100, and a power unit PU is disposed in the motor compartment 101. This power unit PU is intended to drive the left and right front wheels 119 with the left and right front wheels 119 serving as driving wheels while the left and right rear wheels 120 as driven wheels.

The passenger compartment 102, as shown in FIG. 1, is formed on top of the floor panel 100 and is secured as a space from the position of the dash panel 104 to the position of the vehicle rear end face 103. The floor panel 100 is in a flat shape that reduces the unevenness of the floor surface from the vehicle front to the vehicle rear. This passenger compartment 102 is provided with an instrument panel 105, a center console box 106, an air conditioning unit 107, and a vehicle-passenger seat 108.

As shown in FIG. 1, the battery pack BP is located underside of a floor panel 100 and arranged at a central position of the wheelbase, and as shown in FIG. 2, is supported at eight points relative to the vehicle body member representing a vehicle body strength member. The body member is constructed by a pair of side members 109, 109 extending in the fore-and-aft direction or longitudinal direction of the vehicle, and a plurality of cross members 110, 110 by which the pair of the side members are connected to each other in the vehicle width direction. Both sides of battery pack BP are supported at six points by a pair of first side member support points S1, S1, a pair of first cross member support points C1, C1, and a pair of second side member support points S2, S2. The rear end of battery pack BP is supported at two points by a pair of second cross member support points C2, C2.

The power unit PU, as shown in FIG. 1, is placed in the motor compartment 101, and connected to the battery pack BP via a high voltage harness 111 to be used for charging and discharging. This power unit PU is composed by stacking each component in the vertical direction, i.e., a high-voltage module 112 (DC/DC Converter+charger), an inverter 113, and a motor drive unit 114 (the traction motor+a reduction gear+differential gear). Furthermore, at the vehicle front position, a quick charge port 115 and a normal charge port 116 are provided with a charging port lid. The quick charge port 115 and the high-voltage module 112 are connected by a quick charge harness 117. The normal charge port 116 and the high-voltage module 112 are connected by a normal charge harness 118.

The left and right front wheels 119 are supported by the suspension of the independent suspension system, and the left and right rear wheels 120 are supported by a leaf spring suspension 121, 121 of the axle suspension system. Thus, by adopting a leaf spring suspension 121, 121 in the left and right rear wheels 120, it is necessary to avoid interference between the leaf spring suspension 121, 121 and the battery pack BP. Therefore, the mounting position of the battery pack BP, compared to the vehicle with the left and right rear wheels to be supported by a suspension of the independent suspension system, is offset to the vehicle forward position.

[Detailed Configuration of Battery Pack BP]

Figure 3:
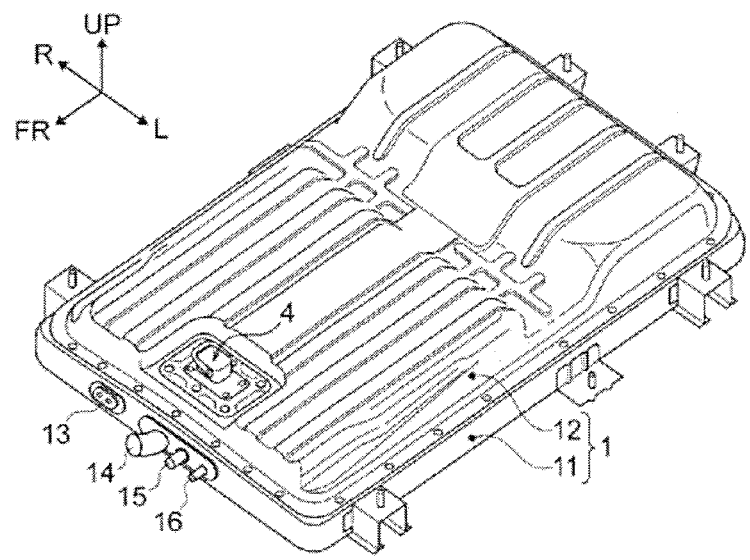
FIG. 3 is an overall perspective view showing the battery pack BP in the harness connection structure in one or more embodiments of the present invention.
Figure 4:
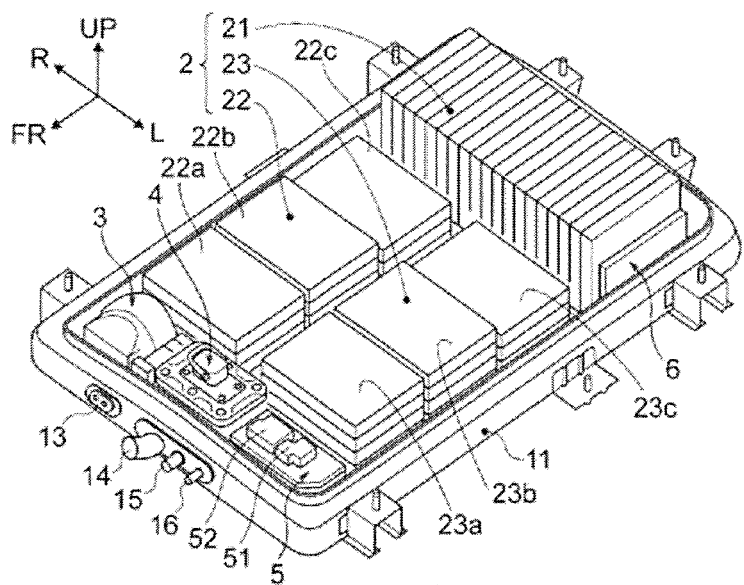
FIG. 4 is a perspective view showing the battery pack BP in the harness connection structure in one or more embodiments of the present invention with a upper cover removed.

FIGS. 3 and 4 are diagrams showing details of the battery pack BP in one or more embodiments of the present invention. Below with reference to FIGS. 3 and 4, a description is given of the detailed structure of the battery pack BP.

The battery pack BP in one or more embodiments of the present invention, as shown in FIGS. 3 and 4, is provided with a battery pack case 1, a battery module 2, the temperature-adjusted air unit 3, a service disconnect switch 4 (high voltage cut-off switch: hereinafter referred to as "SD switch"), a junction box 5, and a Li-Ion battery controller 6 (hereinafter referred to as "LB controller").

As shown in FIGS. 3 and 4, the battery pack case 1 is composed of two components, i.e. a battery pack lower frame 11 and a battery pack upper cover 12.

The battery pack lower frame 11, as shown in FIG. 4, is a frame member which is fixedly supported to the vehicle body member. This battery pack lower frame 11 has a mounting space formed by a square recess for mounting the battery module 2 and other pack components 3, 4, 5, 6. A refrigerant pipe connector terminal 13, a charging/discharging connector terminal 14, a heavy-electric connector terminal 15 and a weak electric connector terminal 16 are attached to the frame front edge of the battery pack lower frame 11.

As shown in FIG. 3, the battery pack upper cover 12 is a cover member bolted onto the outer periphery of the battery pack lower frame 11. The battery pack upper cover 12 in particular has a concavo-convex stepped cover contour surface in conformity with the concavo-convex height shapes of the pack components 2, 3, 4, 5, and 6 mounted on the battery pack lower frame 11.

As shown in FIG. 4, the battery module 20 is mounted on the battery pack lower frame 11 and the battery module 2 is constituted by three divided modules, i.e., a first battery module 21, a second battery module 22, and a third battery module 23. Each battery module 21, 22, and 23 is an assembly structure in which a plurality of battery cells of secondary battery (a lithium ion battery, etc.) is stacked on one another. The detailed configuration of each battery module 21, 22, and 23 is described below.

As shown in FIG. 4, the battery module No. 1, 21 is mounted in a vehicle rear region of the battery pack lower frame 11. As the battery module No. 1, 21, a rectangular shaped battery cell of a thin thickness is prepared, and a plurality of the cells is stacked in the thickness direction. Then, the module is constituted by vertically stacking or piling up the battery cells in the same direction as the vehicle width direction (such as 20 cells stacked vertically).

As shown in FIG. 4, the battery module No. 2, 22 and the battery module No. 3, 23 are configured as a pair of modules, which are separately installed on the left and the right along the vehicle width direction in the vehicle central region forward of the first battery module 21. The battery module No. 2, 22 and the battery module No. 3, 23 are of a flat-stacked configuration of the exactly same pattern. More specifically, a battery cell of rectangular shape of thin thickness is prepared as a constituting unit, and a plurality (such as 4 or five) of these battery cells are stacked in the thickness direction and a plurality of sets of the stacked battery cells (for example, one set of four pieces of stacked battery cells and two sets of five pieces of stacked cells) are prepared. These sets of stacked battery cells are prepared in a flat-stacked state in which the staking direction of the battery cells and the vehicle vertical direction are the same. Finally, the second battery module is configured by placing a plurality of these flat-stacked cells in the vehicle longitudinal direction, for example, by arranging the four flat-stacked cells, the five flat-stacked cells, and the five stacked-cells in the order in the direction from the vehicle rear to the vehicle front. As shown in FIG. 4, the battery module No. 2, 22 has front-side battery module portions 22a, 22b and rear-side battery module portions 22c which is lower than the front-side battery module portion 22a, 22b by a single cell.

As shown in FIG. 4, the temperature control or conditioned air unit 3 is disposed in the right side area of the vehicle front space of the battery pack lower frame 11, and a temperature control air (cold air, hot air) is blown into an air duct 9 of the battery pack BP. Note that the refrigerant is introduced in the evaporator 33 of the temperature control unit 3 through a refrigerant pipe connector terminal or inlet 13 attached to the frame front edge. In addition, the heater operating current is introduced to the PTC heater of the temperature control air unit 3 via a junction box 5.

As shown in FIGS. 3 and 4, the SD switch 4 is located in a central region of the vehicle forward space of the battery lower frame 11 for mechanically cut off the battery heavy-electric circuit through a manual operation. The battery heavy-electric circuit or power circuit is configured by connecting each battery module 21, 22, and 23 containing an internal bus-bar, a junction box 5, and the SD switch 4 each other through bus-bar. When inspecting, repairing, and replacing components such as the heavy-electric module 112, the inverter 113, and the like, the switching between OFF and OFF states of the SD switch 4 can be changed by manual operation.

As shown in FIGS. 3 and 4, the junction box 5 is arranged in the left side area of the vehicle front space of the battery pack lower frame 11 to perform a centralized supply/shutoff/distribution of high voltage by a relay circuit. This junction box 5 is also provided with a temperature control relay 51 and a temperature controller 52 for controlling the temperature control air unit 3. The junction box 5 is connected to an external heavy-electric module 112 via a charge and discharge connector terminal 14 and a charge and discharge harness 111. The junction box 5 is connected to an external electronic control system via the weak electric or low-voltage harness.

As shown in FIG. 4, the LB controller 6 is disposed on the left side end surface position of the battery module No. 1, 21 to perform a capacity management, a temperature management, and a voltage management of each battery module 21, 22, 23. This LB controller 6 acquires battery capacity information, battery temperature information, and battery voltage information through arithmetic processing based on a temperature detection signal of a temperature detection signal line, a battery voltage detection value from the battery voltage signal detection line, and a battery current detection signal of the battery current detection signal line. Further, the LB controller 6 is connected to the external electronic control system through the weak electric harness transmitting an ON/OFF signal of the relay circuit, battery capacity information, battery temperature information, and the like.

[Connection Configuration of High-Voltage Harness]

FIGS. 5 to 8 are detailed views showing the high-voltage harness connection structure of the battery pack BP and the power unit PU in one or more embodiments of the present invention. Below with reference to FIGS. 5-8, a description will be given of the connection structure of the high voltage harness 111.

Figure 5:
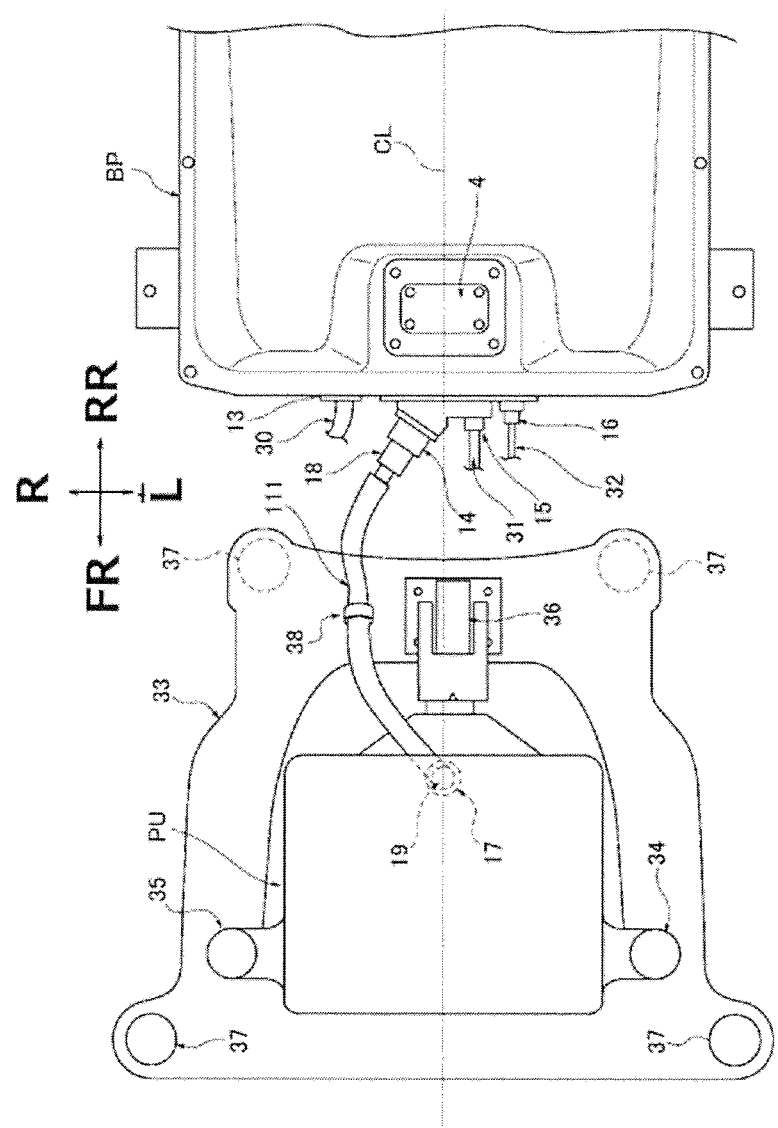
FIG. 5 is a plan view showing a connection structure of the battery pack BP and the power unit PU in the harness connection structure in one or more embodiments of the present invention.

The high-voltage harness connection structure in one or more embodiments of the present invention, as shown in FIG. 5, is provided with a battery pack BP, which is located in the underfloor position of a vehicle, a power unit PU that is disposed on the vehicle front of the battery pack BP, and a high-voltage harness 111 connecting a battery-side high-voltage connector terminal 14 provided on the front end of the battery pack BP and a unit-side high-voltage connector terminal 17 provided on the power unit PU. It should be noted that, in both end positions of the high-voltage harness 111, a high-voltage connector terminal 18 for plug-in connection with the battery-side high-voltage connector terminal 14 and a high voltage connector terminal 19 for plug-in connection with the unit-side high-voltage connector terminal 17, respectively.

The battery pack BP is provided at its front end, as shown in FIG. 5, in addition to the battery-side high-voltage connector terminal 14, a refrigerant tube connector terminal 13, a PTC heater connector terminal 15 (connector terminal for the heater), and the weak electric or low-voltage connector terminal 16. A refrigerant pipe 30 is connected to the refrigerant tube connector terminal 13, the PTC heater harness 31 is connected to the PTC heater connector terminal 15, and the weak electric or low-voltage harness 32 is connected to the low-voltage connector terminal 16. The battery pack BP, as shown in FIG. 5, is positioned in such a manner in which the battery pack center axis matches the central axis CL in the longitudinal direction of the vehicle.

The power unit PU, as shown in FIG. 5, is elastically supported at three points via front-mounted power units 34, 35 and a rear power unit mount 36 to the suspension member 33. The suspension member 33 is elastically supported by four mount portions 37,37,37,37 relative to the pair of left and right side members 109, 109 extending in the longitudinal direction of the vehicle. The front power unit mount portions 34 and 35 are intended for elastically supporting the front left and right position of the power unit PU. The rear power unit mount 36 elastically supports the side central position after the power unit PU. The rear power unit mount 36, as shown in FIG. 5, is elastically supported at a point that is offset slightly leftward from the center axis CL in the vehicle longitudinal direction, not in the central axis CL.

Figure 6:
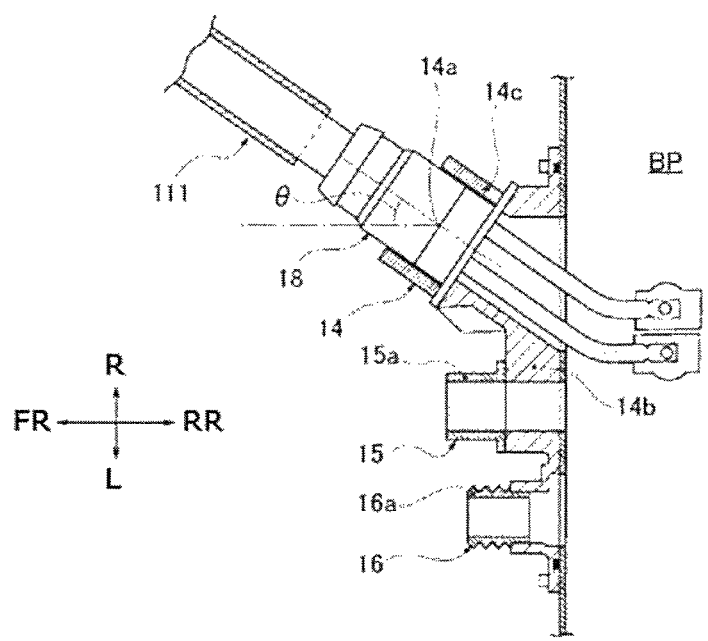
FIG. 6 is an enlarged sectional view showing a sectional configuration of the connector terminals provided at the front end of the battery pack BP in one or more embodiments of the present invention.
Figure 8:
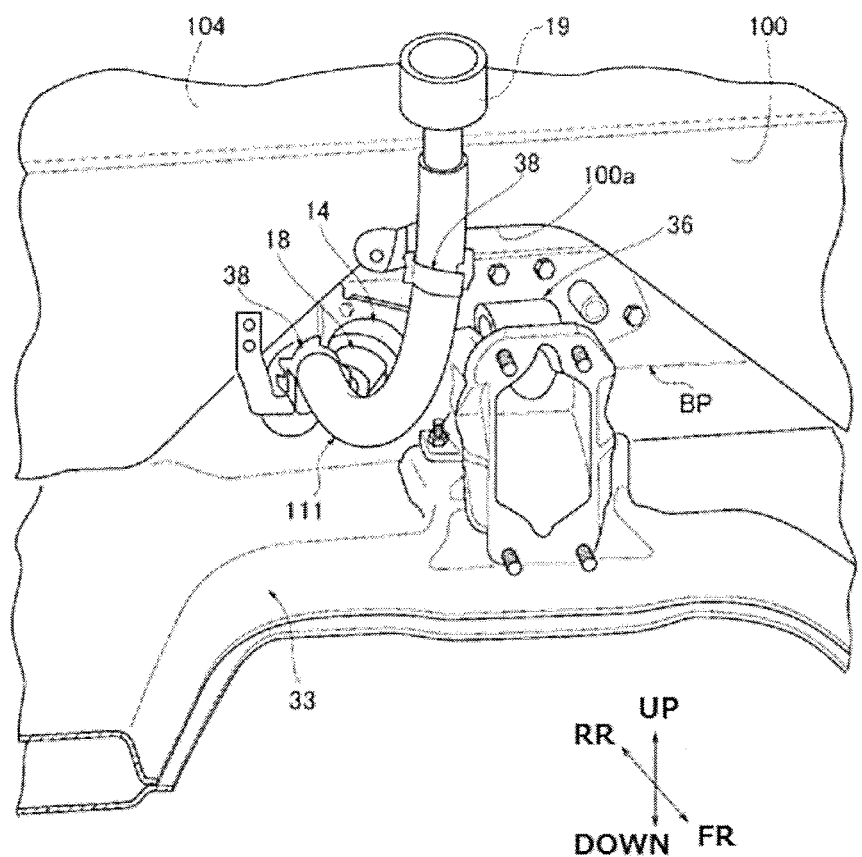
FIG. 8 is a perspective view showing a bent configuration of the high-voltage harness when the high voltage harness connection structure in one or more embodiments of the present invention is seen toward a floor tunnel portion from a motor compartment.

In the battery-side high-voltage connector terminal 14, as shown in FIG. 6, the harness connection plane or surface is configured to form a harness connection inclined surface 14 so that the high-voltage connecter terminal 18 of the high-voltage harness 111 is connected to be inclined outwardly in the vehicle width direction with respect to the vehicle longitudinal direction. As shown in FIG. 8, the battery-side high-voltage connector terminal 14 is disposed in a position facing the floor tunnel portion 100a provided on the floor panel 100. In addition, the horizontal inclination angle θ (with respect to the vehicle longitudinal direction) is set in a manner in which, as shown in FIG. 6, the high-voltage harness 111 may be routed along the floor tunnel portion 100a toward the power unit PU obliquely upward toward the floor tunnel 100a (at approximately 35 degrees, for example). The bending limit of the high-voltage harness 111 composed of two high-voltage harness cables with insulating crust is somewhere about 200R. Thus, it is necessary to bend and route along the floor tunnel 100a diagonally upward. In addition, by setting the inclination angle θ of the harness connection inclined surfaces 14a, it is possible for the high-voltage harness to obtain a horizontal inclination angle θ by being connected to the harness connection inclined surfaces 14a inclined outward in the vehicle width direction with respect to the vehicle longitudinal direction. Note that, by restraining the high-voltage harness 111 at predetermined intervals by harness clips 38, the high-voltage harness may be extended along the floor tunnel 100a.

The battery-side high-voltage connector terminal 14, as shown in FIG. 6, is composed of a connector base portion 14b projecting from the front end of the battery pack BP to be inclined outward in the vehicle width direction and a cylindrical connector terminal portion 14c which is connected to the connector base portion 14b with an inclination angle with respect to the connector base portion 14b. The connector base portion 14b is a common part which provides a connector base portion for the PTC heater connector terminal 15 and a low-voltage connector terminal 16 in addition to the battery-side high-voltage connector terminal 14. In other words, the PCT heater connecting terminal 15 is configured by connecting the connecter base portion 14b to the connector terminal portion 15a. The low-voltage terminal 16 is configured by connecting the connector terminal portion 16a to the connector base portion 14b.

Figure 7:
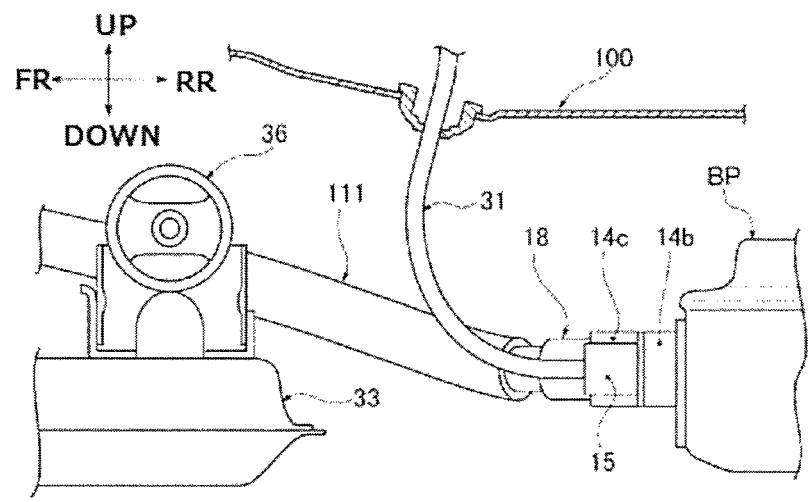
FIG. 7 is an enlarged sectional view showing the arranging or routing structure of a PTC heater harnesses and the positional relationship between the PTC heater connector terminals and the rear power unit mount in the harness connection structure of one or more embodiments of the present invention.

As shown in FIG. 7, a PTC heater harness 31 bent upwardly of the vehicle and extending through the floor panel 100 is connected to the PTC heater connector terminal 15. This is due to the bending limit of the PTC heater harness 31 being higher than the bending limit of the harness 111, so that it is possible to bend the PTC heater harness 31 with smaller radius. Further, the PTC heater connector terminal 15, as shown in FIGS. 5 and 7, is disposed at an adjacent position of the battery-side high-voltage connector terminal 14, and placed at a position opposed to the vehicle longitudinal direction with respect to the rear power unit mount 36. As a result, the battery-side high-voltage connector terminal 14 disposed adjacent to the position of the PTC heater connector terminal 15, will be set at a position slightly apart in the vehicle width direction relative to the rear power unit mount 36.

Now, operation will be described.

A description is made of the connecting operation of the high-voltage harness between the battery pack BP and the power unit PU in the high-voltage harness connection structure for an electrically driven vehicle in one or more embodiments of the present invention.

The battery-side high-voltage connector terminal 14 is provided at the front end of the battery pack BP, which is located under the floor of the vehicle position. On the other hand, the power unit PU which is disposed on the vehicle front of the battery pack BP is provided with a high voltage unit side connector terminal 17. Further, for each of the battery-side high-voltage connector terminal 14 and the unit-side high-voltage connector terminal 17, by inserting or plugging in the high-voltage connector terminal 18 and 19 at both ends, the battery-side high-voltage connector terminal 14 and the unit-side, high-voltage connector terminal 17 are connected by the high-voltage harness 111. When connecting this harness 111, the harness connection surface of the battery-side high-voltage connector terminal 14 is configured to form a harness connection inclination plane or surface 14a inclined outwardly in the vehicle width direction with respect to the vehicle longitudinal direction. Therefore, the high-voltage harness 111 connected to the battery-side high-voltage connector 14 will be connected so as to be inclined outwardly in the vehicle width direction with respect to the vehicle longitudinal direction.

Figure 9:
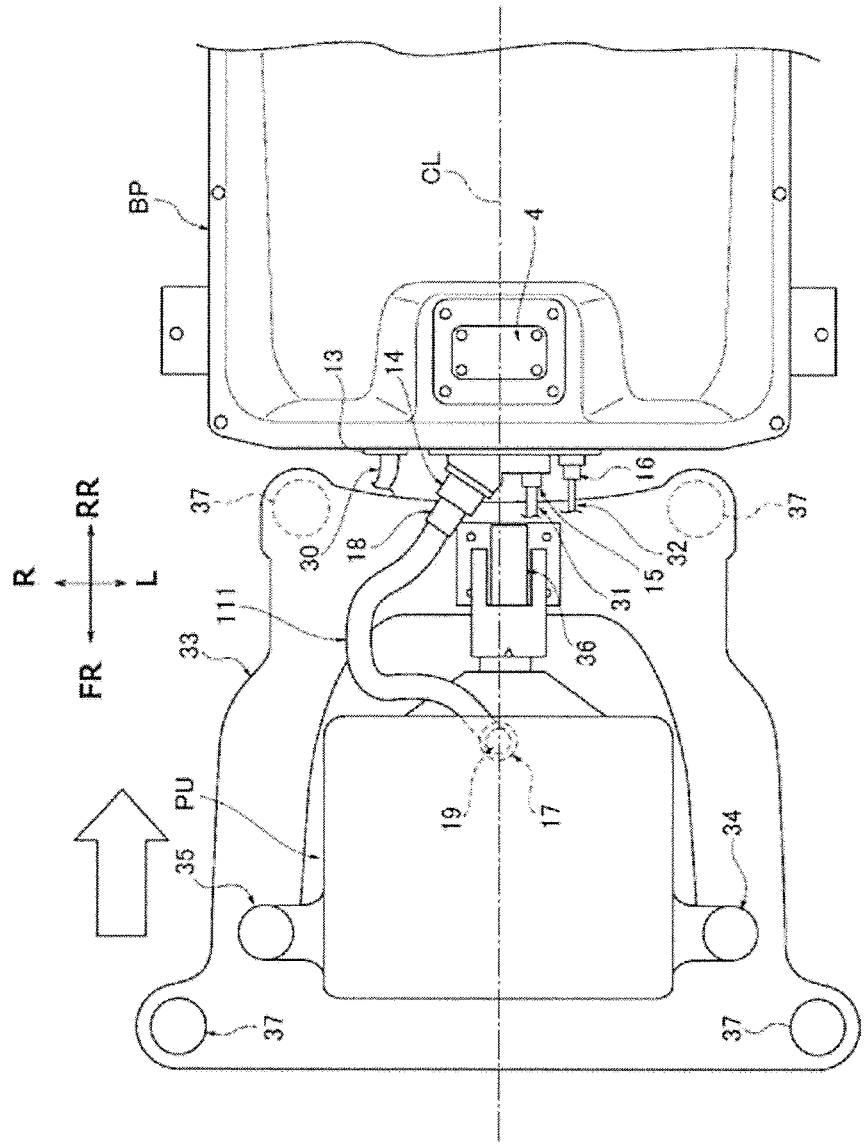
FIG. 9 is an operation explanatory view showing an interference prevention effect of the rear power unit mount and high-voltage harness in the case where the power unit retracts in the vehicle rearward direction at the time of front-crush generation.

Therefore, even when the power unit PU comes to interfere with the high-voltage harness 111, the interference takes place in contact interference with the high-voltage harness 111 that is routed so as to be inclined outwardly in the vehicle width direction with respect to the vehicle longitudinal direction. In other words, as shown in FIG. 9, even when the power unit PU retracts greatly in the vehicle rearward direction upon the front-crush generation, the situation is held in within a range in which the inclination angle of the high-voltage angle will be increased outwardly in the vehicle width direction or the bending amount of the high-voltage harness 111 will be increased.

The interference with the harness 111 due to the retreat of the power unit PU is configured to take place in contact interference. Thus, it is possible to prevent the high-voltage harness from leading to corruption upon retraction of the power unit PU due to impact force associated with front-collision generation.

As a result, as compared with the case where the high-voltage harness is routed in the vehicle longitudinal direction, it is possible to arrange the power unit PU and the battery pack BP more closely spaced to each other in the longitudinal direction of the vehicle so that the layout freedom of the battery pack in the vehicle will be enhanced. That is, when the left and right rear wheels are supported by the leaf spring suspension 121, 121 as in one or more embodiments of the present invention, in the vehicle front position that ensures to avoid interference with the leaf spring suspension 121, 121, the battery pack BP in the same size as in the torsion beam type suspension may be accommodated. Also, when the wheel base length of the vehicle is the same, the configuration will provide a space that can afford to take a longer vehicle longitudinal direction dimension for the battery pack BP to increase the number of cells installed in the battery pack BP. Further, it is possible to increase the battery capacity. Thus, a vehicle layout freedom of the battery pack BP is provided which is to be placed under the floor of the vehicle position.

In one or more embodiments of the present invention, the battery-side high-voltage connector terminal 14 is arranged at a position facing the floor tunnel portion 100a provided on the floor panel 100. Further, such an inclination angle of the harness connection inclined surface 14a (the horizontally inclined angle θ) is adopted at which the high-voltage harness 111 routed toward the power unit PU may be disposed while being bent diagonally upward along the floor tunnel portion 100a. Thus, the high-voltage harness 111 will be configured to be laid diagonally or obliquely upward along the floor tunnel portion 100a in a bent state without reaching the bending limit. Therefore, without causing the high-voltage harness to be bent to the bending limit, bypass-routing of the harness 111 along the floor tunnel portion 100a can be easily performed (see FIG. 8).

In one or more embodiments of the present invention, the battery-side high-voltage connector terminal 14 is configured to be provided with a connector base portion 14b projecting from the front end of the battery pack BP to be inclined outwardly in the vehicle width direction and a cylindrical connector terminal portion 14c to be connected to the connector base portion 14b at an inclined angle with respect to the longitudinal direction of the vehicle.

Therefore, the high voltage battery-side connector terminal 14 may be configured by simply changing the connector base portion 14b while using the existing connector terminal as the cylindrical connector terminal portion 14c. Therefore, by using the existing terminal connector, the battery-side high-voltage connector terminal 14 having a harness connection inclined surface 14a can be obtained at low cost.

In one or more embodiments of the present invention, the harness connection surface of the battery-side high-voltage connector terminal 14 adopts the configuration in which the harness connection inclined surface 14a to the battery side high voltage connector terminal 14 forms a harness connection inclined surface 14a with a horizontally outwardly inclined angle θ with respect to the vehicle longitudinal direction. Therefore, since the horizontally inclined angle θ is secured in advance, it is possible to use the bending limit of the high-voltage harness 111 in the vertical bending direction only, so that the harness may be routed to be bent easily in the oblique upward direction.

Therefore, improvement in connecting operation of the harness 111 from the bottom of the vehicle may be achieved.

In one or more embodiments of the present invention, the rear side center position of the power unit PU is elastically supported via the rear power unit mount 36 relative to the suspension member 33. Further, the battery-side high-voltage connector terminal 14 is disposed on the front end of the battery pack BP and in a position away relative to the rear power unit mount 36 in the vehicle longitudinal direction.

Therefore, when the retraction of the power unit PU occurs, the harness 111 will be subject to contact interfere with inclination with respect to the rear power unit mount 36. For this reason, during the front-crush generation, when the power unit PU retreats to the rear of the vehicle by the impact force, even if the high-voltage harness 111 comes to interfere with the rear power unit mount 36, the harness 111 I would be prevented from leading to damage.

In one or more embodiments of the present invention, the heater connector terminal 15 is placed in an adjacent position of the battery side high-voltage connector terminal 14 and in a position facing the vehicle longitudinal direction with respect to the rear power unit mount 36.

Therefore, the battery side high voltage connector terminal 14 is configured to be slightly outside in the vehicle width direction from a position opposed in the vehicle longitudinal direction with respect to the rear power unit mount 36. Therefore, when a front-crush occurs and the power unit retracts in the vehicle rearward direction by the impact force, in addition to contact interference due to the inclination of the harness 111 to the rear power unit mount 36 being reduced, the interference between the rear power unit mount 36 and the battery-side high voltage connector terminal 14 is prevented.

One or more embodiments of the present invention may obtain one or more of the following effects.

(1) In a high-voltage harness connection structure for an electrically driven vehicle (electric vehicle) provided with a battery pack BP disposed in the underfloor position of the vehicle, a power unit PU arranged in the vehicle forward position with respect to the battery pack BP, and a high-voltage harness 111 that connects a battery-side high-voltage connector terminal 14 disposed on the front end of the battery pack BP and a unit-side high-voltage connector terminal 17 disposed on the power unit PU, the harness connection surface of the battery-side high-voltage connector terminal 14 is configured to form a harness connection inclined plane or surface 14a so that the high-voltage harness 111 is connected to be inclined outwardly in the vehicle width direction with respect to the vehicle longitudinal direction (FIG. 5).

Thus, at the time of front-crush or front-collision generation, even if the power unit PU retracts in the vehicle rearward direction by the impact force, the high-voltage harness 111 will be prevented from being damaged. As a result, as compared with the case where the high-voltage harness is routed in a vehicle longitudinal direction, it is possible to arrange the power unit and the battery pack more closely spaced to each other in the vehicle longitudinal direction so that the vehicle layout freedom of the battery pack BP is enhanced.

(2) The battery-side high-voltage connector terminal 14 is disposed in a position facing the floor tunnel portion 100a provided on the floor panel 100, and the inclination angle of the harness connection inclined surface 14a (horizontal inclination angle θ) is set in such a manner that the high-voltage harness 111 may be routed along the floor tunnel portion 100a toward the power unit PU in an obliquely upward bent state toward the floor tunnel 100a (FIG. 8).

Therefore, in addition to the effect of (1), without causing the high-voltage harness 111 to be bent to the bending limit, bypass-routing of the harness 111 along the floor tunnel portion 100a can be easily performed.

(3) The battery-side high-voltage connector terminal 14 is configured to be provided with a connector base portion 14b projecting from the front end of the battery pack BP to be inclined outwardly in the vehicle width direction and a cylindrical connector terminal portion 14c to be connected to the connector base portion 14b at an inclined angle with respect to the longitudinal direction of the vehicle (FIG. 6).

Therefore, in addition to the effects of (1) and (2), by using an existing terminal connector while changing the connecting base portion 14b only, the battery-side high-voltage connector terminal 14 having a harness connection inclined surface 14a can be obtained at low cost.

(4) The harness connection inclined surface 14a of the battery-side high-voltage connector terminal 14 is configured to have a harness connection inclined surface with a horizontal inclination angle θ inclined outwardly in the vehicle width direction with respect to the vehicle longitudinal direction (FIG. 6).

Therefore, in addition to the effects of (1) to (3), by using the bending limit of the high-voltage harness 111 in the vertical direction only, improvement in the connection work of the harness 111 from the vehicle lower side may be possible.

(5) The rear side center position of the power unit PU is elastically supported via the rear power unit mount 36 relative to the suspension member 33. Further, the battery-side high-voltage connector terminal 14 is disposed on the front end of the battery pack BP and in a position away relative to the rear power unit mounts 36 in the vehicle longitudinal direction (FIG. 5).

Thus, in addition to the effects of (1) to (4), even when the high-voltage harness 11 comes to interfere with the rear power unit mount 36 placed in the most rearward position, it is possible to prevent the high-voltage harness 111 from being damaged.

(6) A PTC heater connector terminal 15 is provided on the front end of the battery pack BP, to which a PTC heater harness 31 extending through the floor panel 100 is connected. Further, the heater connector terminal 15 is disposed at an adjacent position of the battery-side high-voltage connector terminal 14 and at a position opposed to the vehicle longitudinal direction with respect to the rear power unit mount 36 (FIG. 7). As a result, in addition to the effect of (5), since the battery-side high-voltage connector terminal 14 will be set at a position slightly apart in the vehicle width direction relative to the rear power unit mount 36, when a front-crush occurs and the power unit retracts in the vehicle rearward direction by the impact force, in addition to contact interference due to the inclination of the harness 111 to the rear power unit mount 36 being reduced, the interference between the rear power unit mount 36 and the battery-side high voltage connector terminal 14 is prevented.

As described above, the high-voltage harness connection structure in the electrically driven vehicle according to one or more embodiments of the present invention has been described. The specific configuration is not limited to the above. Rather, in accordance with Claims without departing from the scope of the invention, design changes or addition may be acceptable.

In one or more embodiments of the present invention, an example is shown in which the harness connection surface of the battery-side high-voltage connector terminal 14 is configured to be a harness connection inclined surface 14*a* with a horizontal inclined angle θ.

However, as far as the harness connection surface of the battery-side high-voltage connector terminal is concerned, as long as the connection surface makes it possible to connect the high-voltage harness at an angle inclined outwardly in the vehicle width direction with respect to the vehicle longitudinal direction, an example with a harness connection inclined angle with obliquely upward inclination angle may well be applicable.

In one or more embodiments of the present invention, an example is shown in which the high-voltage harness connection structure is applied to an electric vehicle of minivan type that is installed with a driving electric motor as the only vehicle propulsion source. However, the high-voltage harness connection structure according to one or more embodiments of the present invention is of course applicable to a variety of electric vehicles such as sedan and wagon type or SUV type. Furthermore, one or more embodiments of the present invention can also be applied to an electric vehicle of a hybrid type equipped with a traction motor and an engine as drive source for traveling (hybrid electric vehicle). In short, one or more embodiments the present invention can be applied to any electrically driven vehicle as long as the battery-side connector terminal provided at the front end of the battery pack and the unit-side high-voltage connector terminal provided on the power unit are connected via high-voltage harness.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A high-voltage harness connection structure for an electrically driven vehicle, comprising:
   a battery pack disposed in an underfloor position of the vehicle, and comprising a battery-side high-voltage connector terminal disposed on a front end thereof;
   a power unit arranged in a vehicle forward position with respect to the battery pack and comprising a unit-side high-voltage connector terminal disposed thereon, and
   a high-voltage harness that connects the battery-side high-voltage connector terminal and the unit-side high-voltage connector terminal,
   wherein the harness connection surface of the battery-side high-voltage connector terminal forms a harness connection inclined surface so that the high-voltage connector terminal of the high-voltage harness is connected to be inclined outwardly in a vehicle width direction with respect to a vehicle longitudinal direction, and routed in an outwardly bent state in the vehicle width direction with respect to the vehicle longitudinal direction.

2. The high-voltage harness connection structure as claimed in claim 1,
   wherein the battery-side high-voltage connector terminal is disposed in a position facing a floor tunnel portion provided on a floor panel, and
   wherein the inclination angle of the harness connection inclined surface is set to allow the high-voltage harness to be routed along the floor tunnel portion toward the power unit in an obliquely upward bent state toward the floor tunnel.

3. The high-voltage harness connection structure as claimed in claim 1, wherein the battery-side high-voltage connector terminal comprises:
   a connector base portion projecting from the front end of the battery pack inclined outwardly in the vehicle width direction, and
   a cylindrical connector terminal portion connected to the connector base portion at an inclined angle with respect to the longitudinal direction of the vehicle.

4. The high-voltage harness connection structure as claimed in claim 1,
   wherein the harness connection inclined surface of the battery-side high-voltage connector terminal has a harness connection inclined surface with a horizontal inclination angle inclined outwardly in the vehicle width direction with respect to the vehicle longitudinal direction.

5. A high-voltage harness connection structure for an electrically driven vehicle, comprising:
   a battery pack disposed in an underfloor position of the vehicle, and comprising a battery-side high-voltage connector terminal disposed on a front end thereof;
   a power unit arranged in a vehicle forward position with respect to the battery pack and comprising a unit-side high-voltage connector terminal disposed thereon, and
   a high-voltage harness that connects the battery-side high-voltage connector terminal and the unit-side high-voltage connector terminal,
   wherein the harness connection surface of the battery-side high-voltage connector terminal forms a harness connection inclined surface so that the high-voltage harness is connected to be inclined outwardly in a vehicle width direction with respect to a vehicle longitudinal direction, and routed in an outwardly bent state in the vehicle width direction with respect to the vehicle longitudinal direction,
   wherein the rear side center position of the power unit is elastically supported via the rear power unit mount relative to the suspension member, and
   wherein the battery-side high-voltage connector terminal is disposed on the front end of the battery pack and in a position away relative to the rear power unit mounts in the vehicle longitudinal direction.

6. The high-voltage harness connection structure as claimed in claim 5, further comprising:
- a PTC heater connector terminal provided on the front end of the battery pack, to which a PTC heater harness extending through the floor panel is connected,
- wherein the heater connector terminal is disposed at an adjacent position of the battery-side high-voltage connector terminal and at a position opposed to the vehicle longitudinal direction with respect to the rear power unit mount.

7. The high-voltage harness connection structure as claimed in claim 2, wherein the battery-side high-voltage connector terminal comprises:
- a connector base portion projecting from the front end of the battery pack inclined outwardly in the vehicle width direction, and
- a cylindrical connector terminal portion connected to the connector base portion at an inclined angle with respect to the longitudinal direction of the vehicle.

8. The high-voltage harness connection structure as claimed in claim 2,
- wherein the harness connection inclined surface of the battery-side high-voltage connector terminal has a harness connection inclined surface with a horizontal inclination angle inclined outwardly in the vehicle width direction with respect to the vehicle longitudinal direction.

9. The high-voltage harness connection structure as claimed in claim 3,
- wherein the harness connection inclined surface of the battery-side high-voltage connector terminal has a harness connection inclined surface with a horizontal inclination angle inclined outwardly in the vehicle width direction with respect to the vehicle longitudinal direction.

10. The high-voltage harness connection structure as claimed in claim 2,
- wherein the rear side center position of the power unit is elastically supported via the rear power unit mount relative to the suspension member, and
- wherein the battery-side high-voltage connector terminal is disposed on the front end of the battery pack and in a position away relative to the rear power unit mounts in the vehicle longitudinal direction.

11. The high-voltage harness connection structure as claimed in claim 3,
- wherein the rear side center position of the power unit is elastically supported via the rear power unit mount relative to the suspension member, and
- wherein the battery-side high-voltage connector terminal is disposed on the front end of the battery pack and in a position away relative to the rear power unit mounts in the vehicle longitudinal direction.

12. The high-voltage harness connection structure as claimed in claim 4,
- wherein the rear side center position of the power unit is elastically supported via the rear power unit mount relative to the suspension member, and
- wherein the battery-side high-voltage connector terminal is disposed on the front end of the battery pack and in a position away relative to the rear power unit mounts in the vehicle longitudinal direction.

* * * * *